United States Patent
Clare et al.

(10) Patent No.: US 7,290,634 B2
(45) Date of Patent: Nov. 6, 2007

(54) VEHICLE DIFFERENTIAL CONTROL

(75) Inventors: David Clare, Banbury (GB); Keith Gary Reginald Parsons, Cofton Hackett (GB); Jan Prins, Solihull (GB)

(73) Assignee: Ford Global Technologies, LLC, Dearborn, MI (US)

( * ) Notice: Subject to any disclaimer, the term of this patent is extended or adjusted under 35 U.S.C. 154(b) by 521 days.

(21) Appl. No.: 10/513,205

(22) PCT Filed: Apr. 28, 2003

(86) PCT No.: PCT/GB03/01813

§ 371 (c)(1),
(2), (4) Date: Nov. 1, 2004

(87) PCT Pub. No.: WO03/093047

PCT Pub. Date: Nov. 13, 2003

(65) Prior Publication Data

US 2005/0173173 A1    Aug. 11, 2005

(30) Foreign Application Priority Data

May 2, 2002    (GB) .................................. 0210086.5

(51) Int. Cl.
*B60K 23/08* (2006.01)
(52) U.S. Cl. .......................... 180/249; 701/51; 701/69
(58) Field of Classification Search ................ 180/233, 180/247, 248, 249; 701/51, 69
See application file for complete search history.

(56) References Cited

U.S. PATENT DOCUMENTS

| | | | |
|---|---|---|---|
| 5,069,302 A | 12/1991 | Kageyama | |
| 5,311,964 A | 5/1994 | Miyazaki et al. | |
| 7,162,346 B2 * | 1/2007 | Berry et al. | 701/48 |

FOREIGN PATENT DOCUMENTS

| | | | |
|---|---|---|---|
| GB | 2 358 163 A | | 7/2001 |
| GB | 2388349 A | * | 11/2003 |
| JP | 01-036526 A | | 2/1989 |
| JP | 6008742 A | | 1/1994 |
| JP | 010247226 A | | 9/1998 |
| JP | 8282320 A | | 10/1999 |

* cited by examiner

*Primary Examiner*—Kevin Hurley
(74) *Attorney, Agent, or Firm*—Fredrick Owens

(57) ABSTRACT

A differential control system for the center and rear differentials of a four-wheel-drive vehicle comprises a controller (28) which receives signals input from a number of sensors including ride height sensors (42, 44, 46, 48). The controller (28) determines from the ride height signals the degree of articulation of the vehicle suspension and controls the degree of locking of the differentials in response. The degree of locking is increased with increased articulation, and with increased rate of change of articulation.

20 Claims, 3 Drawing Sheets

VEHICLE DIFFERENTIAL CONTROL

The present invention relates to the control of differentials in vehicle drive trains, and in particular to the control of the degree of locking of such differentials.

It has long been known to provide lockable differentials which can be locked or unlocked so as essentially to prevent or allow different rates of rotation of the wheels of a vehicle. It is also known to provide limited slip differentials (LSDs) in which the two sides of the differential output, which are drivingly connected to different wheels on the vehicle, are connected together, for example by means of some form of clutch device, so that the two sides of the differential can move relative to each other, but only when the torque transmitted between the two sides by the differential exceeds a variable limit set by the clutch.

U.S. Pat. No. 5,471,390 and U.S. Pat. No. 5,685,386 disclose control systems for LSDs which vary the locking torque of the differential in response to changes in various parameters of the vehicle's condition or operation.

The present invention provides a control system for controlling a drive torque distribution means arranged to distribute drive torque between a plurality of wheels of a vehicle, wherein the drive torque distribution means is arranged to provide a variable degree of locking between said wheels, the system comprising measuring means for providing a measure of articulation of at least two of the wheels wherein the articulation is a measure of the difference in ride heights between at least two of the wheels, and control means arranged to increase said degree of locking in response to an increase in said articulation.

The level of articulation can be defined in a number of ways. The articulation may be a measure of the difference in ride heights between at least two of the wheels. For example, the articulation may be defined as a front axle articulation, which is the difference in ride height between the two front wheels of the vehicle, or a rear axle articulation, which is the difference in ride height between the two rear wheels of the vehicle. Preferably the measure is a measure of cross articulation, which is articulation of four of the wheels. More preferably the articulation is defined as the difference between the front axle articulation and the rear axle articulation. The measurement is preferably filtered so that low amplitude rapid vertical wheel movements are filtered out.

The measure may have a range of possible values and the control means may be arranged to increase the degree of locking as said measure increases over substantially the whole of said range.

Preferably the control means is arranged to determine a rate of change of said measure and to vary the degree of locking in a manner which depends on said rate of change.

For example, the control means is preferably arranged to increase the degree of locking as said rate of change increases.

Preferably said rate of change can have positive values representing a rate of increase in said measure, and negative values representing a rate of decrease in said measure, and the control means is arranged to increase the degree of locking as the rate of increase increases, but not as the rate of decrease increases.

Preferably the control means has a variable response rate at which the degree of locking can be changed, and the control means is arranged to vary the response rate in response to changes in said displacement.

Preferably the control means is arranged to receive signals from the measuring means, to determine therefrom a measure of said vertical displacement, and to control said response rate in response to changes in said measure.

Preferably the control means is arranged to determine a rate of change of said measure and to control said response rate in response to said rate of change. Desirably the control means is arranged to increase said response rate as said rate of change increases.

Preferably said rate of change can have positive values representing a rate of increase in said measure, and negative values representing a rate of decrease in said measure, and the control means is arranged to increase the response rate as the rate of increase increases, but not as the rate of decrease increases.

The degree of locking preferably comprises the degree to which the rotational speeds of the wheels are locked together.

The differential may be a front or rear differential arranged to distribute drive torque between wheels on opposite sides of the vehicle. Alternatively the differential may be a centre differential arranged to distribute drive torque between the front wheels and the rear wheels of the vehicle.

The drive torque distribution means may be a differential and the control means be arranged to vary said degree of locking by varying a locking torque of the differential.

Alternatively the drive torque distribution means may be arranged to direct drive torque primarily to a first group of said wheels, but to provide a redistribution of the drive torque to a second group of said wheels if the first group suffers a reduction in traction. In this case the control means is preferably arranged to vary said degree of locking by varying the control of said redistribution.

Preferred embodiments of the present invention will now be described by way of example only with reference to the accompanying drawings in which.

Figure 1:
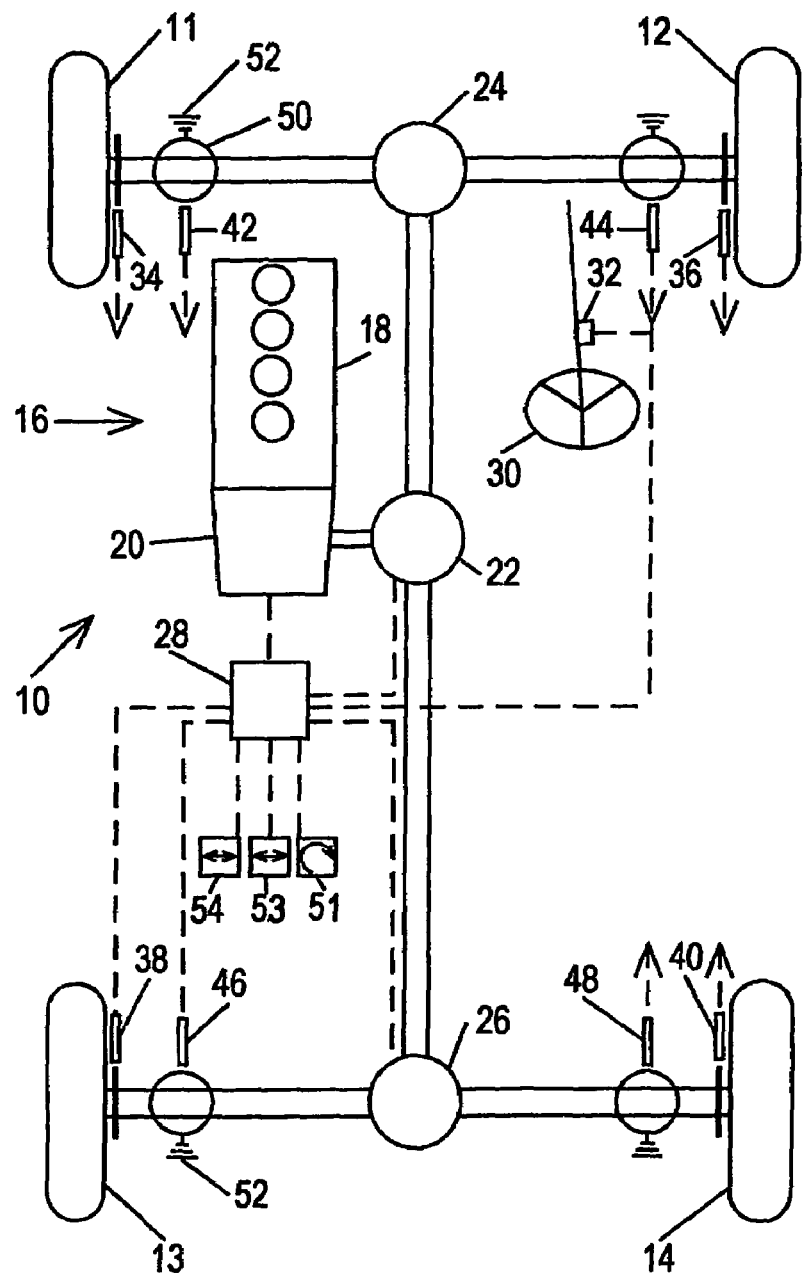
FIG. 1 is a diagrammatic representation of a vehicle including a differential control system according to a first embodiment of the invention.

Referring to FIG. 1, a four wheel drive vehicle 10 has four wheels 11, 12, 13, 14 and a power train 16 for providing driving torque to the wheels. The power train 16 comprises an engine 18, an automatic transmission 20 which transmits drive torque, at any of a number of transmission ratios, to the input side of a centre differential 22. Front and rear differentials 24, 26 receive torque from the centre differential 22 and transmit it to the front wheels 11, 12 and rear wheels 13, 14 respectively. The centre and rear differentials 22, 26 are limited slip differentials in which the degree of locking can be controlled by controlling a clutch pack acting between the two output sides of the differential. This controls the torque difference between the two outputs at which the clutch, and hence the two sides of the output, will start to slip. For torque differences below the locking torque slip will not occur and the differential will behave as if fully locked. If the torque difference exceeds the locking torque the clutch will slip. This torque difference is therefore also the maximum torque that can be transmitted from one output side to the other through the differential. A differential controller 28 controls the locking torque of each of the centre and rear differentials 22, 26.

The vehicle further comprises a steering wheel 30 for steering the front wheels 11, 12. A steering angle sensor 32 provides a steering angle signal which varies with the steering input from the driver. Four wheel speed sensors 34, 36, 38, 40 each provide a wheel speed signal which varies with the wheel speed of a respective one of the vehicle's wheels 11, 12, 13, 14. Four ride height sensors 42, 44, 46, 48 each provide a ride height signal which varies with the ride height of a respective one of the vehicle's wheels 11, 12, 13, 14. These ride height sensors therefore provide a measure of vertical movement of the wheels 11, 12, 13, 14 relative to the vehicle's body.

A yaw sensor 51 provides a yaw signal indicative of the instantaneous yaw rate of the vehicle 10, and a pair of lateral accelerometers 53, 54 provide lateral acceleration signals indicative of the instantaneous lateral acceleration at two points on the vehicle which are vertically spaced from each other.

The controller 28 receives the ride height signals from each of the ride height sensors 42, 44, 46, 48 and determines therefrom a measure of the degree of articulation of the suspension 50 which connects the wheels 11, 12, 13, 14, to the vehicle body 52. This is done by measuring the difference between the ride heights of the two front wheels 11, 12 to determine a front axle articulation, measuring the difference between the ride heights of the two rear wheels 13, 14 to determine a rear axle articulation, and then measuring the difference between the front and rear axle articulations to determine the level of cross articulation. The cross articulation is measured continuously, and the controller 28 therefore can therefore determine instantaneous values of the articulation and the rate of change of articulation.

It will be appreciated that the exact method of calculation of single axle articulation or cross articulation can be carried out in other ways. For example single axle articulation can be measured by measuring the difference between each of the front, or rear, wheels and a reference ride height, and then subtracting these two differences from each other to determine the front, or rear, axle articulation. As another example, cross articulation can be measured by measuring the average height of one diagonally opposite pair of wheels, 11, 14 and the average height of the other diagonally opposite pair of wheels 12, 13 and then determining the difference between these two averages. This difference is a measure of cross articulation equivalent to that described above.

It will be appreciated that, if the vehicle is travelling over rough terrain, such as large boulders, where vertical movement of the wheels is high, there is an increased chance that at least one of the wheels will lose traction. The controller is therefore arranged to increase the locking torque of the centre differential 22 and the rear differential 26 at times when the measured articulation suggests that loss of traction might occur. For ease of explanation, only control of the rear differential 26 will be described in detail.

Figure 2:
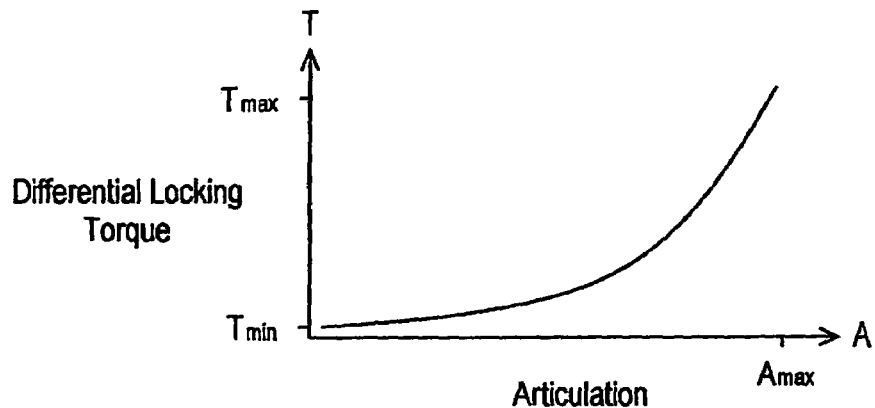
FIGS. 2 to 4 are graphs showing operation of the system of FIG. 1.

Specifically, referring to FIG. 2, which shows how the locking torque varies with articulation assuming all other inputs to the controller 28 are constant, the locking torque T of the rear differential 26 is continuously variable between a minimum value $T_{min}$ at which a very low level of lock is provided, and a maximum value $T_{max}$ at which the differential is effectively fully locked. The articulation A is variable between zero, when all of the vehicle ride heights are equal, to a maximum value $A_{max}$ which will occur, for example, when the wheels are at their maximum displacements, one diagonally opposite pair of the wheels being at maximum ride height and the other diagonally opposite pair being at minimum ride height. The controller 28 is arranged to vary the locking torque as shown in FIG. 2 so that it increases with increasing articulation from $T_{min}$ at zero articulation to $T_{max}$ at maximum articulation. The rate of change of locking torque with articulation also increases as the articulation increases over substantially the whole range of possible articulations to provide a smooth curve as shown.

Figure 3:
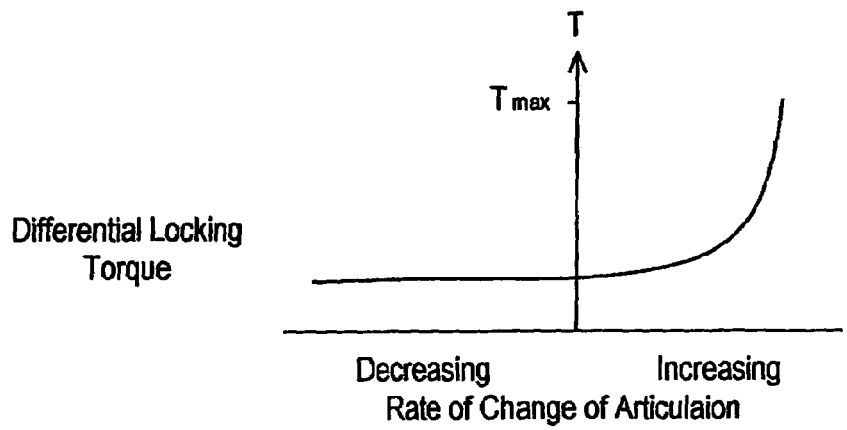

Referring to FIG. 3, which shows how locking torque is varied with rate of change of articulation assuming all other inputs to the controller 28 are constant, the rate of change of articulation dA/dt can have positive values indicating that the articulation A is increasing, and negative values indicating that the articulation A is decreasing. For negative values of dA/dt the differential locking torque is left substantially constant. For positive values of dA/dt, the locking torque T increases as dA/dt increases. This is because, if wheel travel is rapid in a direction which increases articulation, it is likely that the vehicle is approaching a situation where loss of traction will occur. The more rapidly the articulation is increasing, the more rapidly the situation is approaching, and the more rapidly the system needs to respond to prevent loss of traction. The system is therefore arranged to anticipate this loss of traction by locking up the differential 26 before it occurs.

Figure 4:
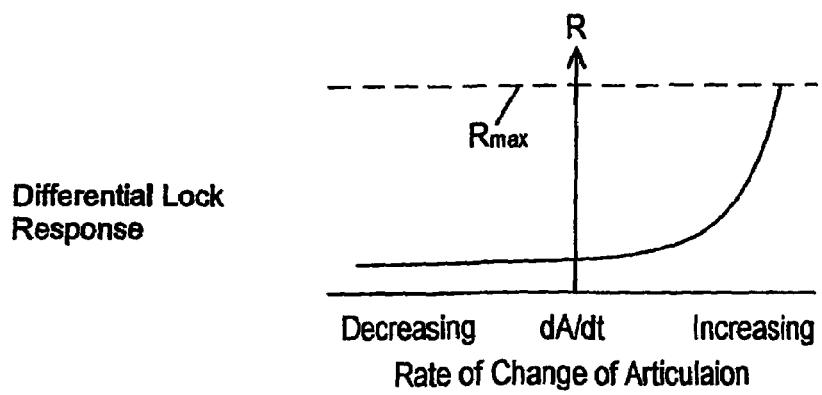

Referring to FIG. 4, which shows how the response rate of the differential controller 28 is varied with rate of change of articulation assuming all other inputs to the controller 28 are constant, the response rate of the controller 28 is variable up to a maximum rate $R_{max}$. Because rapid changes in the degree of locking of the differential 26 might produce instability in the vehicle under some conditions, the response rate is controlled so that it can be kept below the maximum rate $R_{max}$ under some conditions. For positive values of the rate of change of articulation dA/dt, the response rate R is increased as the rate of change of articulation increases. Over this range the rate of change of response time with changes in dA/dt also increases as dA/dt increases. For negative values of the rate of change of articulation the controller response rate is kept substantially constant.

In this embodiment the centre differential is controlled in the same way as the rear differential 26. However, it will be appreciated that the two LSDs might be controlled in different ways under at least some circumstances. Also, if the front differential 24 were a controllable LSD, it could also be controlled in the same way as the other two. Furthermore, in a two wheel drive vehicle with only one differential, that differential could be controlled as described above.

Figure 5:
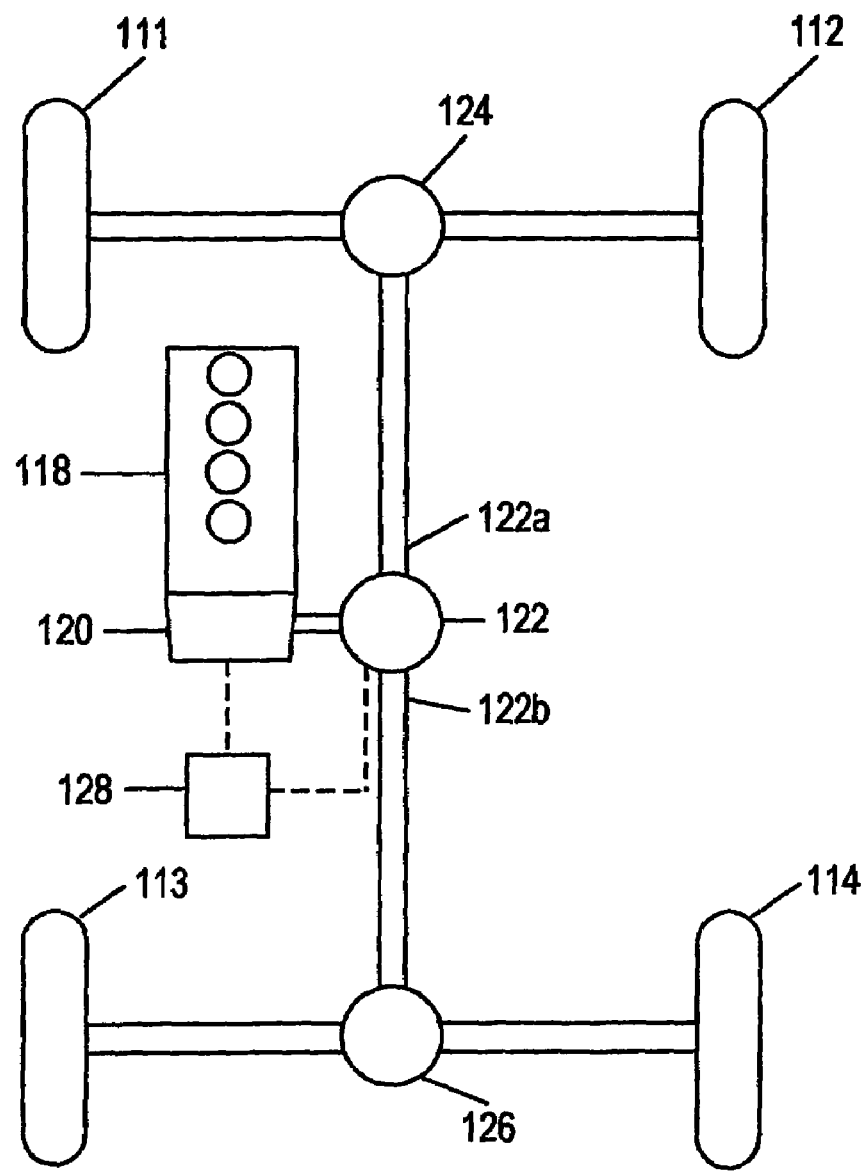
FIG. 5 is a diagrammatic representation of a vehicle including a drive torque distribution system according to a second embodiment of the invention.

Referring to FIG. 5, in a second embodiment of the invention, the centre differential 22 of the first embodiment is replaced by a drive torque distribution unit 122 which distributes drive torque between the front and rear differentials 124, 126. The drive torque distribution unit 122 is arranged to direct all drive torque to the front wheels 111, 112 during normal driving when they have sufficient traction and do not slip. However if the front wheels 111, 112 suffer a partial or complete loss of traction this is detected by the unit 122 by measuring the speeds of its outputs 122a, 122b to the front and rear wheels. A difference in the speeds of the outputs, in particular if the output to the front wheels has a higher speed than that to the rear wheels, this indicates reduction in traction to the front wheels which is affecting the transmission of driving torque to the wheels. The unit 122 therefore starts to transmit a proportion of the driving torque to the rear wheels sufficient to reduce the difference in speeds of the outputs to a predetermined low level. The control unit 128 controls the unit 122 so as to vary the allowable difference in speeds between the front and rear wheels, and hence the degree to which the unit 122 locks the front and rear wheels, and in particular their speeds, together.

By controlling the degree of locking of the front and rear wheels in this manner, the system of FIG. 5 operates in the same manner as that of FIG. 1.

The invention claimed is:

1. A control system for controlling a drive torque distribution means arranged to distribute drive torque between a plurality of wheels of a vehicle, wherein the drive torque distribution means includes a clutch and is arranged to provide a variable degree of locking between said wheels wherein the degree of locking defines a locking torque at which the clutch will start to slip, the system comprising: measuring means for providing a measure of articulation of at least two of the wheels wherein the articulation is a measure of the difference in ride heights between at least two of the wheels, and control means arranged to increase said degree of locking in response to an increase in said articulation characterized in that the degree of locking is continuously variable and the measure has a range of possible values and the control means is arranged to increase the degree of locking as said measure increases over substantially the whole of said range.

2. A system according to claim 1 wherein the measure of articulation is a measure of the articulation of four of the wheels.

3. A system according to claim 1 wherein the control means is arranged to receive signals from the measuring means, to determine therefrom a measure of the vertical displacement of each of the wheels, and to determine the articulation from the vertical displacements.

4. A system according claim 3 wherein the articulation is defined as a measure of the difference between a front axle articulation and a rear axle articulation.

5. A system according to claim 4 wherein the front axle articulation is defined as the difference between the ride heights of two front wheels of the vehicle and the rear axle articulation is defined as the difference between the ride heights of two rear wheels of the vehicle.

6. A system according to claim 1 wherein the control means is arranged to determine a rate of change of said measure of articulation and to vary the degree of locking in a manner which depends on said rate of change.

7. A system according to claim 6 wherein the control means is arranged to increase the degree of locking as said rate of change increases.

8. A system according to claim 7 wherein said rate of change of said measure of articulation can have positive values representing a rate of increase in said measure of articulation, and negative values representing a rate of decrease in said measure of articulation, and the control means is arranged to increase the degree of locking as the rate of increase in said measure of articulation increases, but not as the rate of decrease in said measure of articulation increases.

9. A system according to claim 1 wherein the control means has a variable response rate at which the degree of locking can be changed, and the control means is arranged to vary the response rate in response to changes in said articulation.

10. A system according to claim 9 wherein the control means is arranged to determine a rate of change of said measure of articulation and to control said response rate in response to said rate of change of said measure of articulation.

11. A system according to claim 10 wherein the control means is arranged to increase said response rate as said rate of change of said measure of articulation increases.

12. A system according to claim 11 wherein said rate of change of said measure of articulation can have positive values representing a rate of increase in said measure, and negative values representing a rate of decrease in said measure, and the control means is arranged to increase the response rate as the rate of increase of said measure increases, but not as the rate of decrease of said measure increases.

13. A system according to claim 1 wherein the drive torque distribution means is arranged to distribute drive torque between wheels on opposite sides of the vehicle.

14. A system according to claim 1 wherein the drive torque distribution means is arranged to distribute drive torque between the front wheels and the rear wheels of the vehicle.

15. A system according to claim 1 wherein the degree of locking comprises a degree to which the rotational speeds of the wheels are locked together.

16. A system according to claim 1 wherein the drive torque distribution means is a differential.

17. A system according to claim 16 wherein the control means is arranged to vary said degree of locking by varying a locking torque of the differential.

18. A system according to claim 1 wherein the drive torque distribution means is arranged to direct drive torque primarily to a first group of said wheels, but to provide a redistribution of the drive torque to a second group of said wheels under predetermined conditions.

19. A system according to claim 18 wherein the drive torque distribution means is arranged to provide a redistribution of the drive torque to the second group of said wheels if the first group suffers a reduction in traction.

20. A system according to claim 19 wherein the control means is arranged to vary said degree of locking by varying the control of said redistribution.

* * * * *